US011257138B2

(12) United States Patent
Athimoolam (10) Patent No.: US 11,257,138 B2
(45) Date of Patent: Feb. 22, 2022

(54) TICKET LISTING TRIGGERED BY URL LINKS

(71) Applicant: StubHub, Inc., San Francisco, CA (US)

(72) Inventor: Raghavan Athimoolam, San Francisco, CA (US)

(73) Assignee: StubHub, Inc., San Francisco, CA (US)

( * ) Notice: Subject to any disclaimer, the term of this patent is extended or adjusted under 35 U.S.C. 154(b) by 139 days.

(21) Appl. No.: 16/383,064

(22) Filed: Apr. 12, 2019

(65) Prior Publication Data
US 2019/0340667 A1    Nov. 7, 2019

Related U.S. Application Data

(63) Continuation of application No. 14/141,219, filed on Dec. 26, 2013, now Pat. No. 10,304,110.

(51) Int. Cl.
*G06Q 30/06* (2012.01)
*G06F 16/955* (2019.01)

(52) U.S. Cl.
CPC ..... *G06Q 30/0625* (2013.01); *G06F 16/9566* (2019.01)

(58) Field of Classification Search
CPC ................ G06Q 30/0625; G06Q 30/06; G06F 16/9566; G06F 16/955
USPC ...................................................... 705/26.62
See application file for complete search history.

(56) References Cited

U.S. PATENT DOCUMENTS

| 3,622,995 A | 11/1971 | Dilks et al. |
| 6,064,979 A * | 5/2000 | Perkowski ............. G06Q 30/02 705/26.62 |
| 6,357,658 B1 | 3/2002 | Garczynski et al. |
| 6,701,335 B2 | 3/2004 | Pupalaikis |

(Continued)

FOREIGN PATENT DOCUMENTS

| CA | 2651543 C | 2/2008 |
| IN | 297175 A1 | 7/2009 |
| KR | 20140025928 A | 3/2014 |

OTHER PUBLICATIONS

Advisory Action received for U.S. Appl. No. 14/141,219, dated Jul. 7, 2017, 3 pages.

(Continued)

*Primary Examiner* — Andrew Joseph Rudy
(74) *Attorney, Agent, or Firm* — McDermott Will & Emery LLP (57) ABSTRACT

A ticket purchase application is installed in a communication device to facilitate event ticket purchase. An operating system of the communication device recognizes a type of Uniform Resource Locator (URL) that indicates an entertaining or sporting event. The URL includes a unique code associated with a specific event. The operating system of the communication device may detect user interactions that trigger the URL. When the URL is triggered, the ticket purchase application may be started and the unique code in the URL may be parsed and forwarded to the ticket purchase application. The ticket purchase application uses the unique code to identify the event and searches for tickets associated with the event. The ticket purchase application may list available tickets of the event in an order based on the user's preference. Accordingly, a user may quickly find and purchase a desired ticket by clicking on an URL.

20 Claims, 4 Drawing Sheets

(56) References Cited

U.S. PATENT DOCUMENTS

| | | | |
|---|---|---|---|
| 6,701,355 B1 | 3/2004 | Brandt et al. | |
| 6,959,286 B2* | 10/2005 | Perkowski | G06Q 30/02 |
| | | | 705/26.62 |
| 7,246,116 B2 | 7/2007 | Barsness et al. | |
| 8,010,840 B2* | 8/2011 | Chavez, Jr | G06F 11/0769 |
| | | | 714/26 |
| 8,175,926 B1 | 5/2012 | Handel et al. | |
| 8,190,586 B2 | 5/2012 | Knuetter et al. | |
| 8,458,055 B2* | 6/2013 | Perkowski | G06Q 30/0234 |
| | | | 705/27.1 |
| 8,585,224 B2* | 11/2013 | Ehm | G03F 7/70883 |
| | | | 359/850 |
| 8,718,445 B1* | 5/2014 | Berger | H04N 5/92 |
| | | | 386/249 |
| 8,863,000 B2* | 10/2014 | Broman | G06F 16/957 |
| | | | 715/738 |
| 8,947,714 B2* | 2/2015 | Ishihara | G06F 3/1293 |
| | | | 358/1.15 |
| 9,032,045 B1 | 5/2015 | Leblang | |
| 9,037,513 B2* | 5/2015 | Rosenblatt | G06Q 20/10 |
| | | | 705/64 |
| 9,372,681 B1* | 6/2016 | Shevchenko | G06F 16/9566 |
| 9,491,230 B2* | 11/2016 | Smith | G06Q 20/20 |
| 9,563,414 B2* | 2/2017 | Berg | G06F 8/61 |
| 9,594,956 B2* | 3/2017 | Cohen | G07B 15/02 |
| 9,690,445 B2* | 6/2017 | Rice | G06F 3/0481 |
| 9,800,901 B2* | 10/2017 | McCarthy, III | H04N 21/4325 |
| 10,057,251 B2* | 8/2018 | Strand | G06F 21/45 |
| 10,304,060 B2* | 5/2019 | Ilagan | G06Q 30/01 |
| 10,304,110 B2 | 5/2019 | Athimoolam | |
| 10,356,078 B2* | 7/2019 | Tidwell | H04L 67/1095 |
| 10,489,814 B2* | 11/2019 | King | G06Q 30/0225 |
| 10,687,183 B2* | 6/2020 | Shumaker | H04W 4/21 |
| 10,701,456 B2* | 6/2020 | Cedervall | H04N 21/26216 |
| 10,789,554 B2 | 9/2020 | Sohn et al. | |
| 10,885,474 B2* | 1/2021 | Gibson | G06Q 30/06 |
| 2001/0018660 A1 | 8/2001 | Sehr | |
| 2001/0030234 A1 | 10/2001 | Wiklof | |
| 2002/0007322 A1 | 1/2002 | Stromberg | |
| 2002/0116343 A1 | 8/2002 | Nakamura et al. | |
| 2002/0143618 A1 | 10/2002 | Kenner et al. | |
| 2002/0165931 A1 | 11/2002 | Greer et al. | |
| 2002/0174003 A1 | 11/2002 | Redmann et al. | |
| 2003/0097419 A1 | 5/2003 | Pradhan et al. | |
| 2003/0105641 A1 | 6/2003 | Lewis | |
| 2003/0120543 A1 | 6/2003 | Carey | |
| 2005/0197894 A1 | 9/2005 | Fairbanks et al. | |
| 2006/0081710 A1 | 4/2006 | Streeter | |
| 2006/0123338 A1 | 6/2006 | McCafferey et al. | |
| 2006/0151592 A1 | 7/2006 | Poor | |
| 2007/0124259 A1 | 5/2007 | Sussman et al. | |
| 2007/0208751 A1 | 9/2007 | Cowan et al. | |
| 2007/0276944 A1 | 11/2007 | Samovar et al. | |
| 2008/0005017 A1 | 1/2008 | Poster | |
| 2008/0204282 A1 | 8/2008 | Jeon | |
| 2009/0013244 A1 | 1/2009 | Cudich et al. | |
| 2009/0063206 A1 | 3/2009 | Payne et al. | |
| 2009/0063667 A1 | 3/2009 | Smith et al. | |
| 2009/0164635 A1 | 6/2009 | Denker et al. | |
| 2009/0209240 A1 | 8/2009 | Mahowald | |
| 2010/0082374 A1 | 4/2010 | Charania et al. | |
| 2010/0082491 A1 | 4/2010 | Rosenblatt et al. | |
| 2010/0113072 A1 | 5/2010 | Gibson et al. | |
| 2010/0131366 A1 | 5/2010 | Gibson et al. | |
| 2010/0131530 A1 | 5/2010 | Gibson et al. | |
| 2010/0205053 A1 | 8/2010 | Shuster | |
| 2010/0228576 A1 | 9/2010 | Marti et al. | |
| 2010/0232700 A1 | 9/2010 | Kashibuchi et al. | |
| 2010/0268649 A1 | 10/2010 | Roos et al. | |
| 2011/0119732 A1 | 5/2011 | Dunn | |
| 2011/0147448 A1 | 6/2011 | Johnson | |
| 2011/0288932 A1 | 11/2011 | Marks et al. | |
| 2012/0029997 A1* | 2/2012 | Khan | G06Q 30/0226 |
| | | | 705/14.27 |
| 2012/0078667 A1 | 3/2012 | Denker et al. | |
| 2012/0084292 A1 | 4/2012 | Liang et al. | |
| 2012/0323898 A1 | 12/2012 | Kumar et al. | |
| 2013/0031080 A1 | 1/2013 | Vijaywargi et al. | |
| 2013/0060744 A1 | 3/2013 | Roychoudhuri et al. | |
| 2013/0124234 A1 | 5/2013 | Nilsson et al. | |
| 2013/0132136 A1 | 5/2013 | Sunshine et al. | |
| 2013/0173367 A1 | 7/2013 | Beighley, Jr. | |
| 2013/0191172 A1 | 7/2013 | Tacchi et al. | |
| 2013/0268899 A1 | 10/2013 | Valentino | |
| 2014/0075428 A1 | 3/2014 | Van Elsas et al. | |
| 2014/0095226 A1 | 4/2014 | Kourkoumelis et al. | |
| 2014/0095333 A1 | 4/2014 | Zises | |
| 2014/0100896 A1 | 4/2014 | Du et al. | |
| 2014/0101289 A1 | 4/2014 | Antonov et al. | |
| 2014/0129733 A1 | 5/2014 | Klais | |
| 2014/0280275 A1 | 9/2014 | Copsey | |
| 2014/0280995 A1 | 9/2014 | Ezell | |
| 2015/0012307 A1 | 1/2015 | Moss | |
| 2015/0186973 A1 | 7/2015 | Athimoolam | |
| 2015/0193701 A1 | 7/2015 | Sohn et al. | |
| 2015/0233715 A1 | 8/2015 | Xu et al. | |
| 2016/0044203 A1 | 2/2016 | Paul et al. | |
| 2016/0131487 A1 | 5/2016 | Xu et al. | |
| 2016/0163151 A1* | 6/2016 | Susman | G07F 17/3227 |
| | | | 463/17 |
| 2016/0180602 A1 | 6/2016 | Fuchs | |
| 2016/0189272 A1* | 6/2016 | Albanese | G06F 16/9535 |
| | | | 705/26.62 |
| 2016/0321568 A1* | 11/2016 | Gosuin | H04L 51/36 |
| 2016/0371610 A1* | 12/2016 | Bronner | G06Q 20/045 |
| 2017/0026709 A1 | 1/2017 | Tilaye et al. | |
| 2018/0165882 A1 | 6/2018 | Choi et al. | |
| 2019/0069045 A1 | 2/2019 | Kahn | |

OTHER PUBLICATIONS

Advisory Action received for U.S. Appl. No. 14/141,219, dated Oct. 10, 2018, 3 pages.

Appeal Brief filed on Jan. 14, 2019, for U.S. Appl. No. 14/141,219, 21 pages.

Applicant-Initiated Interview Summary for U.S. Appl. No. 14/141,219, dated Jul. 10, 2017, 3 pages.

Final Office Action received for U.S. Appl. No. 14/141,219, dated Jul. 12, 2018, 10 pages.

Final Office Action received for U.S. Appl. No. 14/141,219, dated Apr. 4, 2017, 14 pages.

Non-Final Office Action received for U.S. Appl. No. 14/141,219, dated Jan. 19, 2018, 14 pages.

Non-Final Office Action received for U.S. Appl. No. 14/141,219, dated Sep. 22, 2016, 13 pages.

Notice of Allowance received for U.S. Appl. No. 14/141,219, dated Feb. 8, 2019, 8 pages.

Response to Final Office Action filed on Jun. 12, 2017, for U.S. Appl. No. 14/141,219, dated Apr. 4, 2017, 20 pages.

Response to Final Office Action filed on Sep. 17, 2018, for U.S. Appl. No. 14/141,219, dated Jul. 12, 2018, 11 pages.

Response to Non-Final Office Action filed on Apr. 19, 2018, for U.S. Appl. No. 14/141,219, dated Jan. 19, 2018, 13 pages.

Response to Non-Final Office Action filed on Jan. 24, 2017, for U.S. Appl. No. 14/141,219, dated Sep. 22, 2016, 15 pages.

International Search Report and Written Opinion, as issued in connection with International Patent Application No. PCT/US2019/054854, dated Feb. 12, 2020, 10 pgs.

Smith, How to Scam Big Money From Sports & Music Fans Everywhere!, Islamorada Investment Management, Nov. 13, 2013, available at https://www.islainvest.com/report/special-report-how-to-scam-big-money.pdf, 3 pgs.

Talalay, Heat firm sues ticket resellers, Miami Sun Sentinel, Jan. 16, 2008, 3 pgs.

U.S. Appl. No. 16/177,266, Aug. 19, 2019, Non-Final Office Action.
U.S. Appl. No. 16/177,266, Feb. 19, 2020, Final Office Action.
U.S. Appl. No. 16/177,266, Jun. 25, 2020, Non-Final Office Action.
U.S. Appl. No. 16/177,266, Oct. 6, 2020, Final Office Action.

* cited by examiner

TICKET LISTING TRIGGERED BY URL LINKS

CROSS-REFERENCE TO RELATED APPLICATIONS

This application is a continuation of and claims priority to U.S. patent application Ser. No. 14/141,219, filed Dec. 26, 2013, entitled "FLEXIBLE CONTENT ORGANIZATION AND RETRIEVAL," now issued U.S. Pat. No. 10,304,110; the disclosure of which is incorporated by reference herein.

BACKGROUND

Field of the Invention

The present invention generally relates to systems and methods for facilitating event ticket listings triggered by URL links.

Related Art

With modern technology, consumers have access to various marketplaces and merchants to make purchases. For example, event tickets for entertainment or sporting events are made available to consumers via not only brick-and-mortar stores but also online stores. An online merchant may offer various entertainment or sporting event tickets on its website. A consumer may visit the merchant's website to find and purchase tickets for a desired event. Nevertheless, there remains some friction in making a ticket purchase. For example, when a consumer finds an event, the consumer has to identify the merchant that offers the event's tickets for sale. The consumer also has to sort or select seats and pay for the selected tickets. These additional steps may hinder the consumer from making a purchase. Therefore, there is a need for a system or method that helps facilitate these additional steps in making a ticket purchase.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a ticket purchase application may be installed in a communication device to facilitate event ticket purchase. An operating system of the communication device may be configured to recognize a type of Uniform Resource Locator (URL) that indicates an entertainment or sporting event. The URL may include a unique code associated with a specific event. The operating system of the communication device may detect user interactions that trigger the URL. When the URL is triggered, the ticket purchase application may be started and the unique code in the URL may be parsed and forwarded to the ticket purchase application. The ticket purchase program may use the unique code to identify the event and search for tickets associated with the event. Further, the ticket purchase program may list available tickets of the event in an order based on one or more user preferences, such as determined from user purchase history of tickets, similar event types, merchandise, and the like. Accordingly, a user may quickly find and purchase a desired ticket by clicking on an URL, with tickets of most interest to the particular user displayed at a top of a ticket list.

Figure 1:
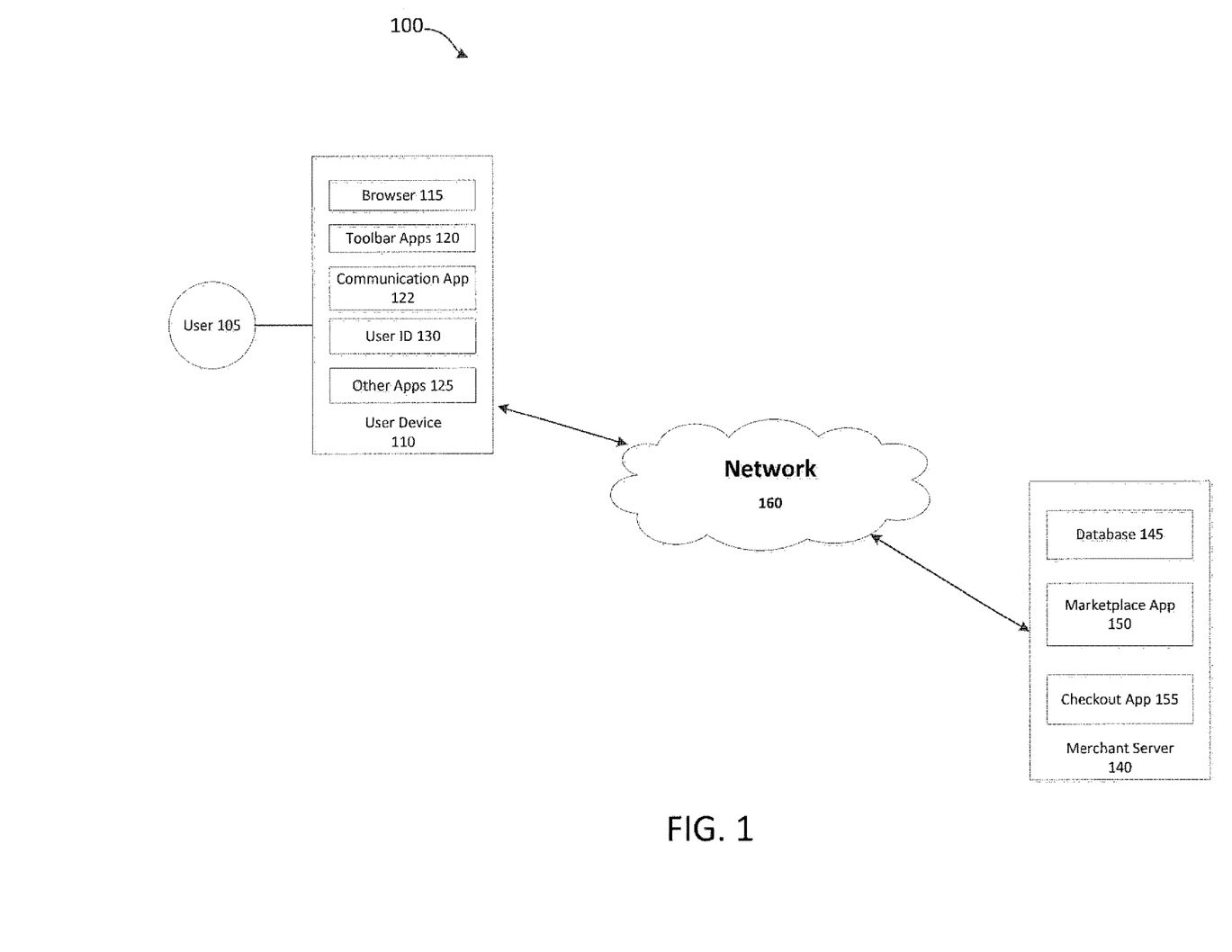
FIG. 1 is a block diagram of a networked system suitable for implementing a process for facilitating ticket purchase according to an embodiment.

FIG. 1 is a block diagram of a networked system 100 suitable for implementing a process for facilitating a ticket purchase according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110 and a merchant server 140 in communication over a network 160. Merchant server 140 may be maintained by a ticket exchange service provider, such as StubHub, Inc. of San Francisco, Calif. A user 105, such as a sender or consumer, may utilize user device 110 to search and purchase event tickets using merchant server 140. A user 105 may utilize user device 110 to browser, find, and pay for a ticket using merchant server 140. For example, a ticket purchase application provided by the ticket exchange service provider may be installed at user device 110 to facilitate ticket purchase by connecting user device 110 to merchant device 110 via network 160.

User device 110 and merchant server 140 each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by the ticket exchange service provider to associate user 105 with a particular account maintained by the ticket exchange service provider. A communications application 122, with associated interfaces, enables user device 110 to communicate within system 100.

User device 110 also may include an operating system that monitors and/or detect user interactions. For example, user device 110 may include a touch screen that displays information to user 105 and receives user input from user 105. User device 110 may monitor user input on the touch screen and may recognize user inputs that activate certain functions, e.g., purchase transactions.

User derive 110 also may collect location data using Global Positioning System (GPS) to identify a location of user device 110. Other means for collecting location data, such as WiFi devices, Near-Field Communication (NFC) devices, or the like also may be included in user device 110 for determining a location of user device 110. Thus, user device 110 may determine a current location of user device 110 based on the collected location data. In another embodiment, user device 110 may send the location data to merchant server 140 and merchant server 140 may determine a current location of user device 110 based on the location data.

Merchant server 140 may be maintained, for example, by a ticket exchange service provider offering various event tickets. The ticket exchange service provider may have a physical point-of-sale (POS) store front and/or an online store. The ticket exchange service provider merchant may provide a marketplace for facilitating buying and selling of various event tickets between buyers and sellers.

Merchant server 140 may include a database 145 identifying available event tickets, which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser 115 or ticket purchase application over network 160 in order to view various event tickets identified in database 145.

Merchant server 140 also may include a checkout application 155 which may be configured to facilitate the purchase by user 105 of event tickets. Checkout application 155 may be configured to accept payment information from or on behalf of user 105 through a payment service provider over network 160. For example, checkout application 155 may receive and process a payment confirmation from the payment service provider, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Figure 2:
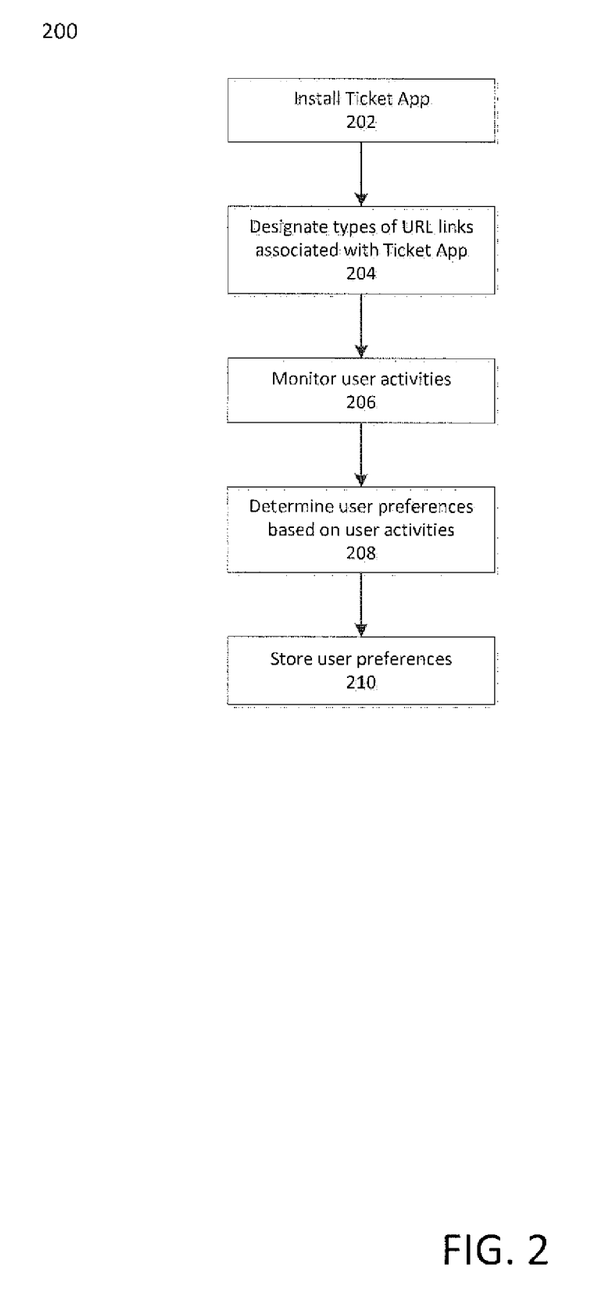
FIG. 2 is a flowchart showing a process for setting up an application for making ticket purchases according to one embodiment.

FIG. 2 is a flowchart showing a process 200 for setting up a ticket purchase application according to one embodiment. At step 202, a ticket purchase app may be installed on user device 110. For example, user 105 may visit the ticket exchange service provider's website or a mobile app store to download the ticket purchase application. The operating system of user device 110 may install the ticket purchase application. The ticket purchase application may facilitate ticket purchase at the ticket exchange provider. In particular, the ticket purchase application may connect user device 110 to merchant server 140 and may allow user device 110 to browse, search, and purchase event tickets offered at the ticket exchange service provider.

At step 204, certain types of URL links may be associated with the ticket purchase application. In particular, URL links that include a name or web address of the ticket exchange service provider may be associated with the ticket purchase application. For example, URL links may include text such as: "http://www.stubhub.com" or "m.stubhub.com" for a ticket exchange service provider named "StubHub." When the ticket purchase application is installed at user device 110, the ticket purchase application may register an intent with the operating system of user device 110 that the ticket purchase application is to handle these types of URL links.

At step 206, user device 110 may monitor user activities. In particular, user device 110 may monitor and collect user activities to learn user 105's preferences. User activities, such as browsing history, purchase history, music preference, social network, user location, travel history, user schedule, and the like may be used to determine user 105's preferences.

At step 208, the user activities collected in step 206 may be used to determine user 105's preferences for event tickets. For example, a user's purchase history may indicate that the user had purchased tickets for baseball box seats several times. Thus, user device 110 may determine that the user prefers box seats at baseball games or that the user prefers premium seating at sports events. In another example, user device 110 may analyze user 105's purchase history and note that user 105 makes purchases of name brand or premium version of common items. Thus, user device 110 may determine that user 105 prefers or is able to afford premium priced tickets for VIP experiences.

In still another example, user device 110 also may analyze browsing history and note that user 105 has browsed or searched for tickets for bleacher seats for baseball games, orchestra seats for evening plays, seats in a family section for weekend matinee games, etc. Even though user 105 does not purchase a ticket, user device 110 may use the browsing history to infer user preferences for family friendly sections for other events. Other preferences, such as smoking or non-smoking sections, child-friendly sections, non-alcoholic sections, general admission tickets, seats behind a home team, seats at an end zone, or the like may be inferred from browsing or purchasing history, where preferences would be specific to specific events or games. Thus, in one embodiment, a user preference may be different for different events, venues, etc., in another embodiment, the user preferences may be the same in general for all ticketed events, and in yet another embodiment, the user preferences may be the same for a similar type of event (baseball games), but different for another type of event (concerts). In one example, user preferences for a Dodgers vs. Padres game may be different than for a Dodgers vs. Red Sox game.

In some embodiments, user device 110 may survey user 105 regarding user 105's preferences in sporting or entertainment events. The survey may include user 105's taste in music or sports, favorite sports teams or music groups, seating preferences, spending preferences, schedule preferences for attending events, and etc. This can be useful in the situation where the system is unable to determine user preferences for an event. Thus, user device 110 may use these user preferences to better customize tickets offered to user 105 even when there is no user history.

At step 210, user device 110 may store the user's preferences in a memory of user device 110. In one embodiment, user device 110 may forward the user's preferences to merchant server 140 and merchant server 110 may store and associate the user's preferences with the user's account.

By using the above process 200, a ticket purchase application from a ticket exchange service provider may be installed on a user device. In particular, one or more particular types of URL links may be designated at the user device to trigger the ticket purchase application. Further, user activities may be monitored and collected for determining user preferences and the user preferences may be used for facilitating ticket purchase.

Figure 3:
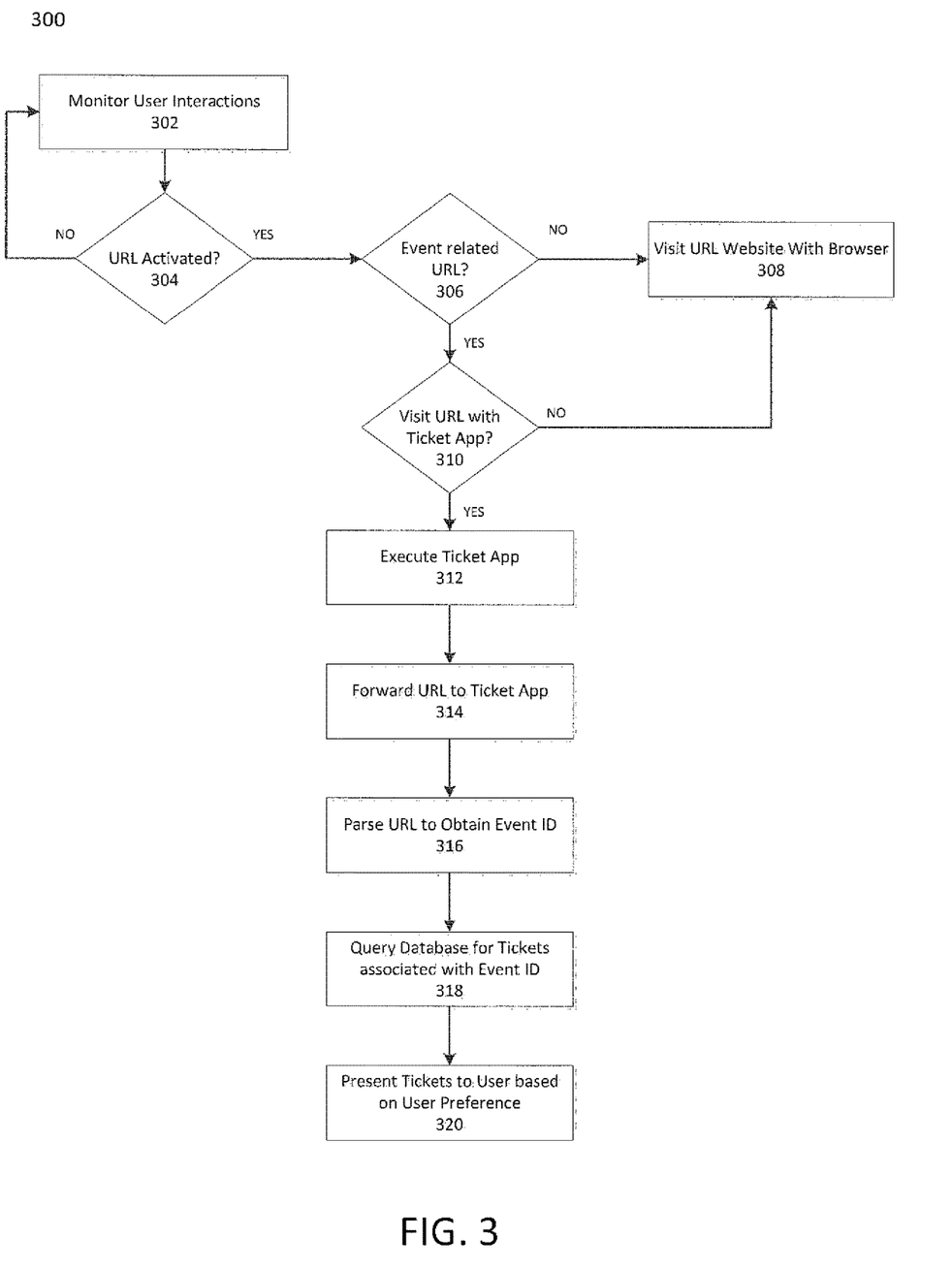
FIG. 3 is a flowchart showing a process for making ticket purchases according to one embodiment.

FIG. 3 is a flowchart showing a process for facilitating ticket purchase according to one embodiment. At step 302, user device 110 may monitor user interactions with user device 110. For example, user 105 may operate user device 110 to execute various applications, such as internet browsers, work related applications, multimedia applications, etc. In particular, user device 110 may monitor whether user 105 has activated an URL link at step 304. For example, various URL links may be provided in a web page, an email, a text message, an advertisement, various applications, etc. The URL links may be embedded in a web object, such as a text, an image, a video, a form, or the like. User 105 may activate an URL link by selecting on the web object in which the URL link is embedded using a computer mouse, a touch screen, a keyboard, or the like.

If no URL link is activated, process 300 may return to step 302 to continue monitoring of user activities. If a URL link is activated, user device 110 may determine whether the activated URL link is a type of URL link that may trigger the ticket purchase application at step 306. As noted above at step 204, a type of URL link may contain a specific text, such as the name or web address of the ticket exchange service provider. The type of URL link may be designated to trigger the ticket purchase application. Thus, user device 110 may read the activated URL link to determine whether the activated URL link contains the specific text to determine whether the activated URL link triggers the ticket purchase application. URL links that are associated with a ticketed event, even though not having a direct link to the ticket provider or for ticket purchase, may also be used to trigger a ticket purchase flow. For example, a user may select a link that simply provides information to a home page of an event, such as a circus or theatrical production. The ticket provider may recognize this is an event in which the ticket provider has tickets for sale for.

If the activated URL is not a type of URL link that triggers the ticket purchase application, user device 110 may activate a browser to open a web page indicated by the URL link at step 308. For example, the browser of user device 110 may use the URL address to request the web page from the server that host the web page via network 160 and may display the web page to user 105.

If the activated URL is a type of URL link that triggers the ticket purchase application, user device 110 may inquire user 105 whether the URL link should be activated using the ticket purchase application at step 310. For example, a window or message may be displayed to user 105 with the text: "Open URL link with StubHub App?" User 105 may be allowed to respond by clicking on a "YES" or "NO" button. If user 105 selects "NO," user device 110 may activate the URL link using the browser at step 308. For example, the browser may obtain a webpage from merchant server 140 and display the webpage at user device 110.

Each of the specific type of URL links may include an event ID. The event ID may be associated with a specific sporting or entertainment event. The specific type of URL links also may include a date, time, and location of the specific sporting or entertainment event. For example, an URL link: "https://www.stubhub.com/show-boat-san-fi-ancisco-tickets/show-boat-san-francisco-san-francisco-war-memorial-opera-house-6-1-2014-4343628/" may be associated with a webpage that provides information on tickets for a "Show Boat San Francisco" event on Jun. 1, 2014 at the San Francisco War Memorial Opera House. In particular, the unique event ID "4343628" may correspond to the specific event of Show Boat San Francisco. Thus, at step 308, the browser may obtain and display the web page associated with a sporting or entertainment event using the activated URL link.

If user 105 selects "YES" at step 310, user device 110 may activate the ticket purchase application at step 312. At step 314, user device 110 may forward the URL to the ticket purchase application. The ticket purchase application may parse the URL to obtain the event ID at step 316. For example, the ticket purchase application may receive the URL link: "https://www.stubhub.com/show-boat-san-francisco-tickets/show-boat-san-francisco-san-francisco-war-memorial-opera-house-6-1-2014-4343628" and may extract the last seven character of the URL to obtain the event ID.

At step 318, the ticket purchase application may query database 145 of the ticket exchange service provider to find tickets associated with the event ID. For example, the ticket purchase application may connect to merchant server 140 via network 160 and may search for available tickets for the event ID. Database 145 may store tickets of the event currently available for purchase. In particular, each ticket may include the price of the ticket and the position of the seat.

At step 320, the ticket purchase application may present the available tickets for the event to user 105 at user device 110. In particular, the ticket purchase application may present a list of available tickets sorted based on the user's preferences. For example, the ticket purchase application may access the user preference derived from user activities at step 208. Thus, the list of available tickets may be sorted based on user preference, such as price of the ticket, value of the tickets, and/or position of seats. For example, if user 105 prefers premium seats, the ticket purchase application may sort the list of available tickets by price to display premium tickets first.

In some embodiments, the tickets may be sorted by value to user. Based on user 105's purchase history, user device 110 may determine that user 105 likes to make purchases that have good discounts. Thus, user device 110 may sort the tickets based on best values to the user, e.g., presenting tickets with most discount to the user first.

User device 110 also may consider multiple user preferences when sorting the tickets. For example, user device 110 may consider user preferences for seat position and best value tickets. As such user device 110 may find tickets that are in the user's desired seat section and sort the tickets in the desired seat section based on ticket value, e.g., percentage of discounts. Thus, user 105 may be presented with tickets for seats in the desired seat section that have best value first in the list of tickets.

When considering multiple user preferences, user device 110 may weigh the user preferences based on importance. For example, the position of seats may be more important than the price of tickets and may weigh more for prioritizing the tickets in the list. The priority or importance among various user preferences may be determined by user instructions or by user's activities. For example, based on user's purchase history, user device 110 may note that user had purchased tickets multiple times only in a certain section of the stadium and may determine that the position of seats is of great importance to the user and may give more weight to position of seats when sorting the list of tickets.

In some embodiment, the tickets may be sorted based on objective or comparative values of the tickets. This sorting may be in addition to the sorting based on user preferences for seat types or locations. For example, the ticket exchange service provider may a seating map/chart of the event and may analyze seating positions to determine seats that have similar position and value. Seats in similar sections or distance from the stage may have similar values. Different sellers may list tickets at different prices determined by sellers at the ticket exchange service provider. Although two seats may be in the same or similar position, the tickets for the seats may be listed at different prices by different sellers. Thus, the ticket purchase application may compare the prices of the tickets for seats that are in similar positions and may present the ticket that has the best price for these similar seat positions to the user first. As such, the user may quickly find the tickets that have the best value among similar seats. In some embodiments, the ticket prices offered by sellers may be compared to the retail prices of the tickets to determine tickets with the best value for the user.

For example, there may be several seats in an orchestra section for a play. The ticket purchase application may determine that the user prefers orchestra seats. Thus, the orchestra seats may be listed first. In addition, the ticket purchase application also may determine that seats 2-4 in section 102, row 4 are being sold for only 580, while most other seats in the general location are being sold for $120. As such, the ticket purchase application may determine that the $80 tickets have better value than the $120 tickets and may present the $80 tickets to the user first. Next best value tickets are then shown. So, within the listing of orchestra seats, the least expensive are listed first (relative to those being offered in the same general area).

In some embodiments, the front seats in a section may be shown to the user first than the back seats of the same section, even though the back seats have better price. This is because the front seats of the same section have better value, e.g., better view of the stage, than the back seats, even though tickets for back seats have the same price. Other factors that may affect the value of the ticket include special circumstances of the event. For example, in certain area of the stadium, the seats may allow the audience to meet a performer or an athlete when they enter or exit the stadium. Some area of the stadium may be more accessible to food vendors or parking. Some area of the stadium may have better chance of catching a foul baseball. Thus, the ticket purchase application may determine the value of the ticket objectively based on multiple factors, such as seller's listing price, retail price, position of the seats, overall layout of the stadium, special circumstances of the event.

By using the above process 300, a URL associated with an event may be identified. When the URL is activated, a ticket purchase application may use the URL to find tickets available for the event and may display the tickets to a user. In particular, the list of tickets may be sorted based on a user's preferences derived from user's previous activities, such as browsing history or purchase history.

The following is an exemplary scenario in which the above processes 200 and 300 may be implemented.

Example 1

The user enjoys baseball. The user installs a ticket purchase application at the user's cell phone from the ticket exchange service provider and uses the ticket purchase application to purchase tickets for baseball games. The user's cell phone remembers the user's preference for outfield seats based on the user's purchase history. The ticket exchange service provider sends an advertisement email to the user advertising tickets for the season's games. The advertisement email includes promotional images enticing viewers to purchase tickets for upcoming games. The promotional images may depict baseball plays and may be embedded with URL links for upcoming games. The URL links may include event ID's of respective games.

The user receives the email at the user's cell phone and sees a promotional image of a game that the user is interested in attending. The user clicks or taps on the promotional image to activate the URL embedded in the image. The user's cell phone asks the user whether the URL should be opened using the ticket purchase application. The user responds positively. The URL is then forwarded to the ticket purchase application. The ticket purchase application extracts the event ID from the URL and queries the database at the ticket exchange service provider for available tickets associated with the event ID.

The ticket purchase application may sort the available tickets and display a list of tickets based on the user's preferences. For example, based on the user's preference for outfield seats, the ticket purchase application may display the tickets for outfield seats first in the list to the user. Further, the prices for the seats in the outfield section may further be compared with each other or with the retail price to determine objective value of the tickets. In particular, prices of tickets for similar seat positions are compared to determine the tickets that have the best values. Thus, the tickets that are in the outfield sections may be further sorted based on best value.

Thus, by simply clicking on an URL, the user may activate the ticket purchase application to view a list of available tickets for the event associated with the URL. Further, the list of tickets may be sorted based on the user's preference, such that the user may view the preferred tickets immediately to purchase the tickets, with the preferred tickets of best relative value to other preferred tickets shown at the top of the list. This eliminates the need for the user to manually try and determine which seats give the user the best value in a certain section or of a certain type.

Figure 4:
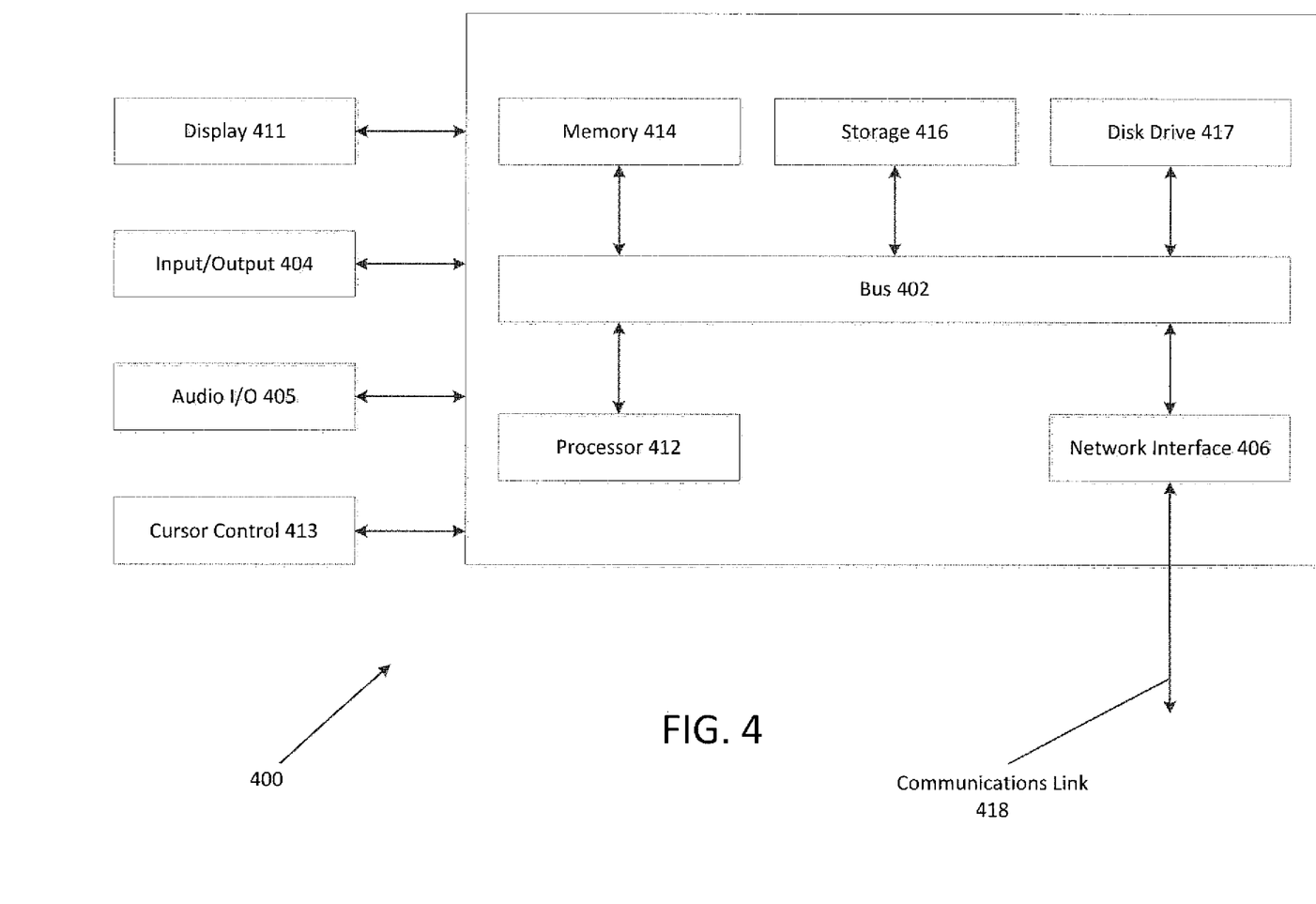
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    providing registration information to an operating system of a computing device when a ticket purchasing application is installed on the computing device;
    automatically launching the ticket purchasing application by the operating system of the computing device when a particular type of a Uniform Resource Locator, identified by the registration information, is selected by a browser application installed in the computing device, wherein the particular type of a Uniform Resource Locator includes an event identifier that corresponds to a ticketed entertaining or sporting event;

receiving, from the operating system, the event identifier;

querying a ticket exchange service provider for one or more tickets associated with the event identifier; and providing results of the query to the operating system of the computing device.

2. The method of claim 1, wherein querying the ticket exchange service provider comprises querying one or more databases associated with the ticket exchange service provider using the event identifier.

3. The method of claim 1, wherein a result of the querying is displayed in an order that is based, at least in part, on user preference information identified by the application.

4. The method of claim 3, wherein the user preference information is determined, based at least in part, on a user interaction with the application.

5. The method of claim 3, wherein the user preference information is based, at least in part, on a purchase history.

6. The method of claim 3, wherein the user preference information is based, at least in part, on a browsing history associated with one or more received searches for ticketed events.

7. The method of claim 1, wherein the application is a ticket purchase application.

8. A method, comprising:

providing a registration information to an operating system of a computing device when a ticket purchasing application is installed on the computing device;

automatically launching the ticket purchasing application by the operating system of the computing device when a particular type of a Uniform Resource Locator, identified by the registration information, is selected by a browser application installed in the computing device, wherein the particular type of a Uniform Resource Locator includes a unique identifier that corresponds to a particular result of a received query associated with a ticketed entertaining or sporting event;

receiving, from the operating system of the computing device, the unique identifier;

using the unique identifier to query a database for the particular result associated with the unique identifier; and providing the particular result to the operating system of the computing device.

9. The method of claim 8, wherein the application is a ticket purchase application.

10. The method of claim 8, wherein the unique identifier is used to identify a ticketed event.

11. The method of claim 8, wherein the database is associated with a ticket exchange service provider.

12. The method of claim 8, wherein the particular result is identified based, at least in part, on stored preference information.

13. The method of claim 12, wherein the stored preference information is based, at least in part, on a received interaction with the application.

14. The method of claim 12, wherein the stored preference information is based, at least in part, on a browsing history associated with one or more received searches for similar particular results.

15. A method, comprising:

receiving registration information from a ticket purchasing application installed on a computing device;

automatically launching the ticket purchasing application by the computing device when a first Uniform Resource Locator, displayed on a user interface of the computing device, is selected by a browser application installed in the computing device;

determining whether the first Uniform Resource Locator is a particular type of Uniform Resource Locator identified by the registration information of the application, wherein the particular type of Uniform Resource Locator includes an event identifier that corresponds to a ticketed entertaining or sporting event;

when it is determined that the first Uniform Resource Locator is the particular type of Uniform Resource Locator identified by the registration information of the application:

parsing the first Uniform Resource Locator to identify query information contained in the first Uniform Resource Locator;

automatically launching the application; and providing the query information to the application.

16. The method of claim 15, wherein the application is a ticket purchase application.

17. The method of claim 15, wherein the query information is a unique identifier associated with a one or more query results.

18. The method of claim 17, wherein the one or more query results include one or more results to ticketed events.

19. The method of claim 18, wherein the one or more results to ticketed events are displayed using a display preference information.

20. The method of claim 19, wherein the display preference information is based, at least in part, on received application interaction data.

* * * * *